(12) United States Patent
Ashwood-Smith

(10) Patent No.: US 9,838,311 B2
(45) Date of Patent: Dec. 5, 2017

(54) NODE, NETWORK CONTROLLER, AND ASSOCIATED METHODS FOR ROUTING DATA PACKETS IN A NETWORK

(71) Applicant: Huawei Technologies Co., LTD., Shenzhen (CN)

(72) Inventor: Peter Ashwood-Smith, Gatineau (CA)

(73) Assignee: HUAWEI TECHNOLOGIES CO., LTD., Shenzen, Guangdong (CN)

( * ) Notice: Subject to any disclaimer, the term of this patent is extended or adjusted under 35 U.S.C. 154(b) by 205 days.

(21) Appl. No.: 14/610,608

(22) Filed: Jan. 30, 2015

(65) Prior Publication Data

US 2016/0226758 A1 Aug. 4, 2016

(51) Int. Cl.
*H04L 12/721* (2013.01)
*H04L 12/26* (2006.01)
*H04L 12/707* (2013.01)
*H04L 12/841* (2013.01)
*H04L 12/723* (2013.01)

(52) U.S. Cl.
CPC .......... *H04L 45/72* (2013.01); *H04L 43/0852* (2013.01); *H04L 43/16* (2013.01); *H04L 45/22* (2013.01); *H04L 47/283* (2013.01); *H04L 45/50* (2013.01)

(58) Field of Classification Search
CPC ....... H04L 45/72; H04L 45/22; H04L 47/283; H04L 43/16; H04L 43/0852; H04L 45/50
See application file for complete search history.

(56) References Cited

U.S. PATENT DOCUMENTS

| | | | |
|---|---|---|---|
| 6,775,280 B1 * | 8/2004 | Ma | H04L 45/00 370/230 |
| 8,077,602 B2 * | 12/2011 | Arimilli | G06F 15/17 370/217 |
| 8,576,715 B2 | 11/2013 | Bloch et al. | |
| 2004/0022260 A1 * | 2/2004 | Rosengard | H04L 12/6418 370/412 |

(Continued)

FOREIGN PATENT DOCUMENTS

| | | |
|---|---|---|
| CN | 1787486 A | 6/2006 |
| CN | 101917732 A | 12/2010 |

OTHER PUBLICATIONS

SIPO of the P.R. China; International Search Report and Written Opinion issued in corresponding International Application No. PCT/CN2016/072547 dated Apr. 15, 2016; 11 pages.

*Primary Examiner* — Jay P Patel
(74) *Attorney, Agent, or Firm* — Norton Rose Fulbright Canada LLP

(57) ABSTRACT

There is disclosed a node for routing data packets in a flow. The node generally comprises a receiver which is configured to receive a command to reroute the flow from a first source route to a second source route. The node also includes a processor for determining that a period of time between first and second consecutive data packets of the flow exceeds a threshold value and a transmitter configured to transmit the second data packet on the second source route in response to the determination. Alternatively, the determination of a period of time between first and second consecutive data packets of the flow can be made by a network controller which can instruct a given node to perform the rerouting of the flow in a manner to route only the second and following consecutive data packets along the second source route.

25 Claims, 7 Drawing Sheets

(56) References Cited

U.S. PATENT DOCUMENTS

| | | | |
|---|---|---|---|
| 2004/0131067 A1* | 7/2004 | Cheng | H04J 3/062 370/412 |
| 2005/0073961 A1* | 4/2005 | Paik | H04L 12/2697 370/252 |
| 2006/0034339 A1* | 2/2006 | Liu | G01R 31/31709 370/517 |
| 2007/0171830 A1* | 7/2007 | Vulkan | H04J 3/0632 370/235 |
| 2008/0056125 A1* | 3/2008 | Kneckt | H04L 41/00 370/229 |
| 2009/0067324 A1* | 3/2009 | Licardie | H04L 12/40182 370/225 |
| 2009/0190490 A1* | 7/2009 | Finer | H04L 43/0852 370/252 |
| 2011/0170445 A1* | 7/2011 | Finer | H04L 43/0852 370/252 |
| 2012/0014377 A1* | 1/2012 | Joergensen | H04L 43/0852 370/352 |
| 2015/0188804 A1 | 7/2015 | Ashwood-Smith | |

* cited by examiner

NODE, NETWORK CONTROLLER, AND ASSOCIATED METHODS FOR ROUTING DATA PACKETS IN A NETWORK

FIELD

The improvements generally relate to the field of network communications, and more particularly, to systems, devices and methods for source routing data packets in a network.

BACKGROUND

In the field of communication networking, it is known that networks incorporate a plurality of interconnected nodes for transmitting, forwarding and/or receiving information which is generally segmented into a plurality of data packets. To enable communication between these nodes, communication protocols have been established, for instance, by the International Organization for Standardization (ISO). Among these communication protocols, source routing is used to sequentially forward the plurality of data packets along a partially or completely specified sequence of intermediate nodes along a given network route.

Although existing systems, devices and methods involving source routing have been satisfactory to a certain degree, there remained room for improvement, particularly in terms of addressing issues associated with routing data packets during transmission.

SUMMARY

In accordance with one aspect, there is provided a node for routing data packets in a flow. The node generally comprises a receiver which is configured to receive a command to reroute the flow from a first source route to a second source route. The node also includes a processor for determining that a period of time between first and second consecutive data packets of the flow exceeds a threshold value and a transmitter configured to transmit the second data packet on the second source route in response to the determination.

In accordance with another aspect, there is provided a method for routing data packets in a flow. The methods comprises the step of receiving a command to reroute the flow from a first source route to a second source route, wherein the first and the second source routes being different. The method also has the steps of determining that a period of time between first and second consecutive data packets of the flow exceeds a threshold value; and transmitting the second data packet on the second source route in response to the determination.

In accordance with another aspect, there is provided a network controller for controlling a flow of data packets through a network. The network controller being configured to determine expected arrival time information for two or more consecutive data packets at a node in the network; determine that a period of time between first and second consecutive data packets of the flow exceeds a threshold value based on the expected arrival time information; and transmit, to one of the nodes, an instruction to reroute the flow from a first source route to a second source route in response to the determination, such that the one of the nodes transmits the first data packet along the first source route and transmits the second data packet along the second source route.

In accordance with another aspect, there is provided a method of controlling nodes of a network in the routing of a flow of data packets. The method can comprise determining expected arrival time information for two or more consecutive data packets at a node in the network; determining that a period of time between first and second consecutive data packets of the flow exceeds a threshold value based on the expected arrival time information; and transmitting, to one of the nodes, an instruction to reroute the flow from a first source route to a second source route in response to the determination, such that the one of the nodes transmits the first data packet along the first source route and transmits the second data packet along the second source route.

In accordance with another aspect, there is provided a network controller for routing data packets in a flow. The network controller comprises a network module which is operatively coupled to the network and which is configured to forward, to a node of the network, a command to reroute the flow from a first source route to a second source route, wherein the first and the second source routes being different. The network controller also has a network database having stored thereon a computer software product executable by the network module. The computer software product has computer code to install routing instructions on the node of the network. The routing instructions, which are executable by a processor of the node, include after receiving of the command to reroute the flow, determining that a period of time between first and second consecutive data packets of the flow exceeds a threshold value; and transmitting the second data packet on the second source route in response to the determination.

In accordance with another aspect, there is provided a method for routing data packets in a flow. The method has the step of forwarding routing instructions to the node of the network, wherein the routing instructions are executable by a processor of the node. The routing instructions include after receiving a command to reroute the flow, determining that a period of time between first and second consecutive data packets of the flow exceeds a threshold value; and transmitting the second data packet on the second source route in response to the determination.

In accordance with another aspect, there is provided a network communication system. The network communication system includes at least one data source which is coupled to a first node. The first node is configured to route, to a second node, data packets along a first source route across at least one intermediate node, wherein the first source route has a first transmission delay. The network communication system also has at least one data destination which is coupled to the second node. After occurrence of a command to reroute the flow from the first source route to a second source route, the second source route being across at least one other intermediate node and having a second transmission delay, the first node is further configured to route the flow to the second source route after determining that a period of time between first and second consecutive data packets of the flow exceeds a threshold value.

Many further features and combinations thereof concerning the present improvements will appear to those skilled in the art following a reading of the instant disclosure.

DESCRIPTION OF THE FIGURES

In the figures.

These drawings depict example embodiments for illustrative purposes, and variations, alternative configurations, alternative components and modifications may be made to these example embodiments.

DETAILED DESCRIPTION

Some network control scenarios involve changing the route of a flow of data packets in the network as these data packets are being conveyed by the network. This action of changing the source route of the flow is commonly referred to as rerouting. In some instances, changing the source route of the flow has been known to lead to communication errors. Re-ordering of the data packets, for instance, can occur if the transmission delay of the new source route is smaller than the transmission delay of the initial source route.

Methods and systems are described herein wherein, in relevant situations, after occurrence of a command to reroute, rather than automatically proceeding to reroute of the flow, a period of time elapsed since the sending of a last sent data packet and prior to the sending of the next data packet is monitored. The subsequent data packets are only routed along the new source route when this monitored period of time is determined to have reached a given threshold value. The given threshold value can be selected as a function of the difference in transmission delays between the two source routes, can optionally take into consideration a tolerance of the network or other factors, or be selected as a function of any other consideration deemed appropriate in specific alternate circumstances, to name possible examples.

The monitoring can be done directly by measuring the time between consecutive packets in the flow, or can be inferred via the traffic rate of data packets in the flow, or by some other appropriate means. In the scenario where the monitoring is done directly by measuring the period of time, if the measured period of time is not determined to exceed the given threshold value, the immediately subsequent data packet is still sent along the initial route and the time between subsequent pairs of consecutive packets can be measured to determine whether a next data packet will be sent along the new route. This process can be repeated a number of times, until a period of time having a duration of at least the given threshold value is detected, prior to sending the subsequent data packets along the new source route.

Examples of embodiments will now be detailed.

Figure 1:
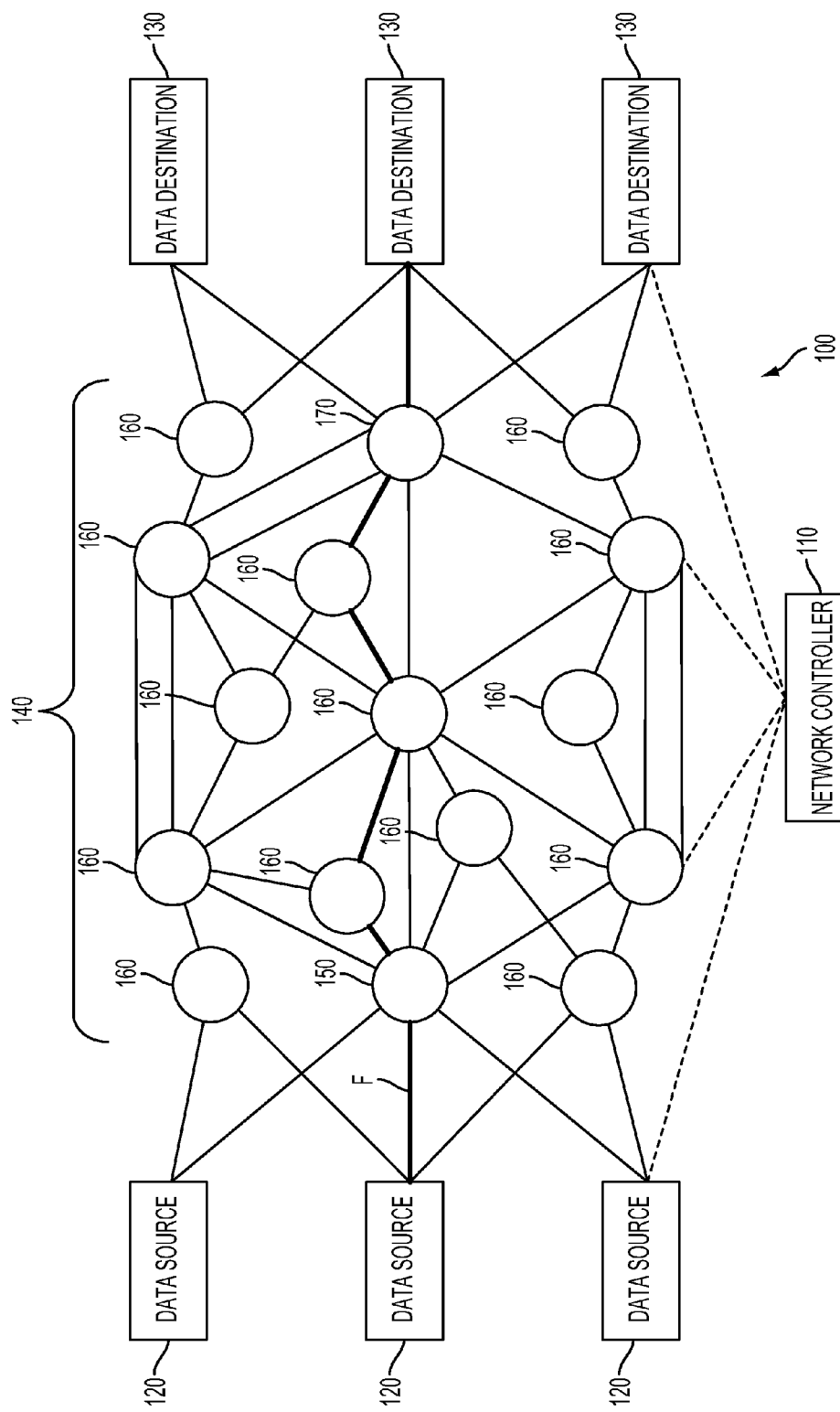
FIG. 1 is a network diagram of a first example of a network communication system, in accordance with an embodiment.

FIG. 1 illustrates a first example of a network communication system 100. As depicted, the system 100 includes a network controller 110, data sources 120, and data destinations 130, interconnected by a packet-switched network 140. The packet-switched network 140 includes a plurality of nodes. More specifically, FIG. 1 illustrates a flow F (see the bold line) having a first node 150, intermediate nodes 160 and a second node 170. In this example, the first node 150 is an ingress node while the second node 170 is an egress node. However, the first node 150 may or may not be an ingress node while the second node 170 may or may not be an egress node, for instance.

The methods and systems disclosed herein can be used in network communication systems 100 which involve source routing. Typically, source routing allows partially or completely specifying the sequence of nodes, links and/or a combination thereof to be followed by a flow of a plurality of data packets. Data associated with the sequence of nodes and/or links, which is referred to herein as a source route, is incorporated into each of the data packets as a header which can be read and processed by each one of the subsequent nodes 150, 160, and 170 of the packet-switched network 140. In an embodiment, the source route is generally selected by the network controller 110 while the header is incorporated to the data packets by the first node 150. In other words, the network controller 110, using the network communication system 100, selects and communicates to the first node 150 the source route to be followed by the flow. The source node 150 incorporates a header, indicative of the source route, into each of the data packets of the flow.

As the nodes 150, 160, and 170 of the packet-switched network 140 are physically remote from one another, an amount of time required for a data packet to travel from the first node 150 to the second node 170, i.e. a transmission delay, generally depends on the source route to be followed. While the source route may be taken by all the data packets of the flow, some administrative and/or operational reasons can cause the network controller 110 to alter the source route of some of the data packets during transmission of the flow by sending a command to reroute to the first node 150. In this situation, communication errors may arise if the transmission delay associated with the new source route is equal to or smaller than the transmission delay associated with the prior source route. Indeed, one possible source of such a communication error can be where a data packet subsequently sent along the new source route arrives at the egress node prior to a data packet previously sent along the prior source route, thus causing the egress node to receive the plurality of the data packets in an order different from that in which they were initially sent. This type of communication error is often referred to as a "re-ordering" of the data packets. It was found that receiving the data packets in the order in which they were initially sent by the ingress node can be preferred; therefore, the methods and systems disclosed herein contribute to prevent this re-ordering of the received data packets during transmission along the network communication system 100.

Figure 2:
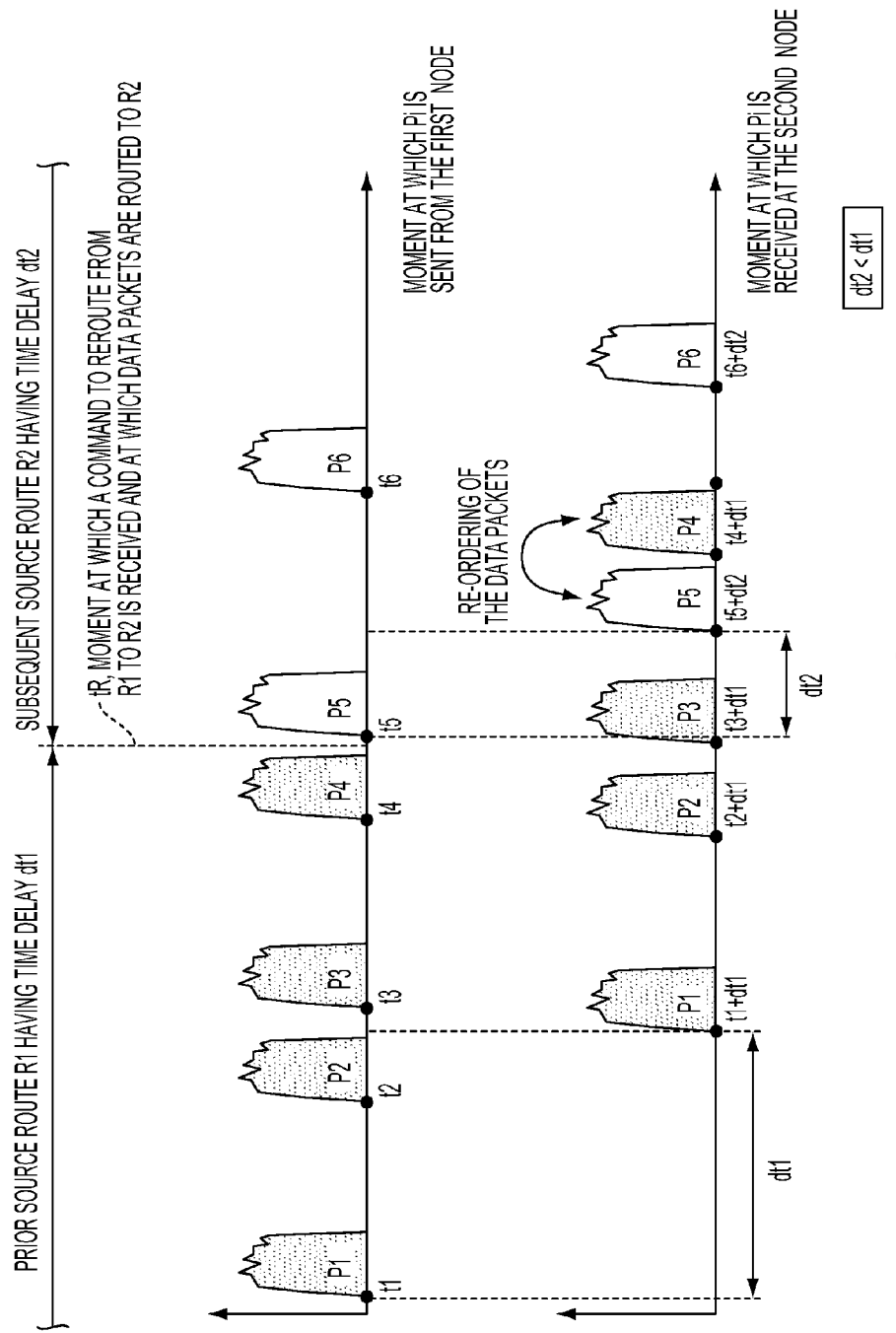
FIG. 2 is a schematic diagram showing an example flow of data packets in a network communication system.

FIG. 2 is a schematic diagram showing an example of re-ordering of the data packets in a network communication system. As depicted, the upper timeline shows the time (e.g., moment) at which each data packet Pi is sent from a first node, while the lower timeline shows the moment at which each data packet Pi is received at a second node. In this example, the prior source route is a first source route R1 characterized by a first transmission delay dt1 and the subsequent source route is a second source route R2 being characterized by a second transmission delay dt2. In other words, data packet P1 is sent at moment t1 and is received at moment t1+dt1, data packet P2 is sent at moment t2 and is received at moment t2+dt2 and so forth. In the illustrated example, the second transmission delay dt2 is significantly smaller than the first transmission delay dt1, to the extent that data packet P5, sent after data packet P4, shortly after the reception of the command to reroute (moment tR), is received prior to data packet P4, a situation referred to herein as re-ordering of the data packets, which is undesired.

Figure 3:
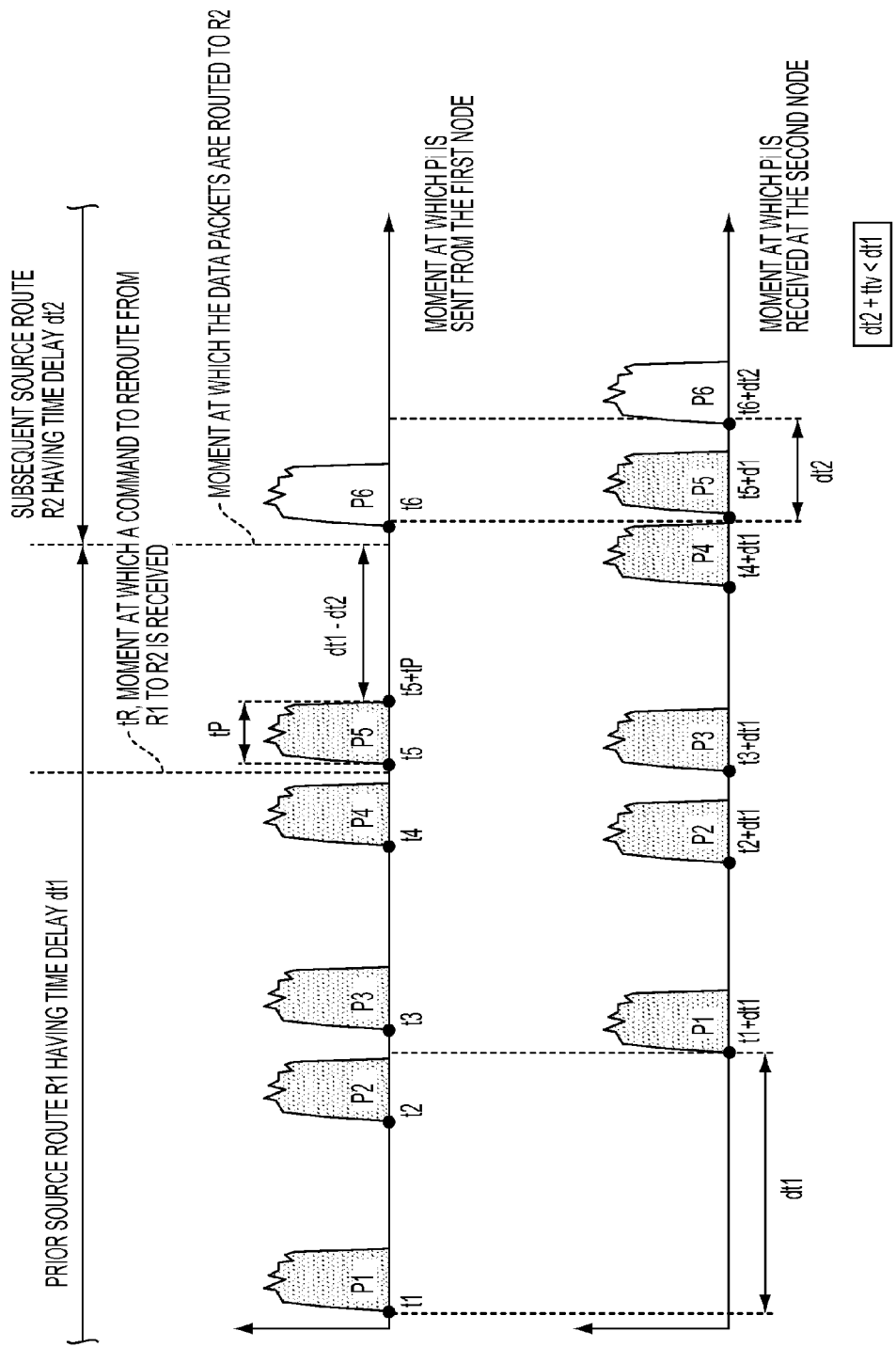
FIG. 3 is a schematic diagram showing an example flow of data packets in a network communication system.

FIG. 3 is a schematic diagram showing a scenario where re-ordering of the data packets is avoided. The flow of data packets shown in FIG. 3 is similar to the flow of data packets previously described in FIG. 2. In this example, the command to reroute is received at moment tR. Rather than giving effect to the command to reroute and sending the data packet P5 over the second source route immediately, the data packet P5 (together with potentially other data packets) is continued to be sent along the first source route R1. Only once a period of time having a sufficient duration is detected in the flow are the subsequent data packets routed along the second source route R2. The 'sufficient' duration can be said to correspond to a given threshold time value which avoids re-ordering of the data packets, which will typically be the case if the period of time has at least the duration of the difference of time between the first and the second transmission delays (dt1−dt2).

In alternate embodiments, it can be preferred to set the given threshold time value to the smallest value as deemed functional in a given network so as to reduce delays in data transmission. Since most networks can manage a given extent of overlapping of data packets without re-ordering, for instance, a given threshold time value Thres can be set as corresponding to:

$$\text{Thres} = dt1 - dt2 - ttv,$$

where ttv is an optional tolerance time value associated with the tolerance of the network to packet reordering (e.g. an amount of temporal overlapping of data packets which a given network can tolerate/deal with by buffering or the like without causing communication errors).

It may be suitable to express the difference between the first time delay dt1 and the second time delay dt2 as a transmission delay difference, which will be referred herein to as Dt.

In alternate embodiments, the given threshold value can be any suitable time value and can be unrelated to values of dt1 and dt2.

In one embodiment, the duration of the period of time can be measured directly by measuring the period of time elapsed between consecutive data packets in the flow. In other words, after the end of a data packet is detected, the amount of time elapsed is measured and compared to the threshold value. If another data packet in the flow is to be routed prior to the elapsed time reaching the threshold value, the other data packet is routed along the first source route. The measurement can be repeated after the other packet is routed, and for all subsequent packets, until the threshold duration elapses before a next packet in the flow is detected, at which point the next packet in the flow is routed along the second source route.

In another embodiment, the sufficient duration may be inferred from a traffic rate of the flow. In particular, the sufficient duration can be inferred upon determining that the traffic rate (e.g. bits/s) of data packets in the flow is reduced to a point where the time elapsed between successive data packets in the flow is likely to exceed the threshold time value. For instance, for a given traffic rate in the flow, the determination of the amount of time between successive data packets can be further based on an estimated average data packet duration. The threshold time value can then be set based on the traffic rate and the estimated average data packet duration. When there is significant variation in the duration of data packets, a factor such as the standard deviation of the estimated average data packet duration can be taken into consideration in the determination of the tolerance time value. An embodiment where the standard deviation is high may warrant the selection of a more conservative tolerance time value, for example. In some embodiments, an initial value for the tolerance time value can be set based on a rough approximation, and the tolerance time value can then be adjusted iteratively until considered satisfactory.

In an embodiment, the first node 150 can verify mathematical conditions to determine when the command to reroute is to be applied. As presented above, in one embodiment, the mathematical conditions typically involve determining whether a period of time having a sufficient duration has been detected (e.g. measured or inferred). The sufficient duration being referred to as Thres, the determination can essentially be presented as Period_of_time≥Thres.

In an embodiment, the period of time mentioned above is measured from a moment ti+tP, that is, from the moment ti at which the data packet Pi's transmission is initiated plus the temporal duration tP of the data packet Pi, as depicted in FIG. 3. The temporal duration tP of the data packets in a flow may or may not be uniform. It is contemplated that the time between consecutive packets may be measured from the time ti, for example when the temporal duration of packets in the flow is relatively uniform, in which case the tolerance time value may be adjusted to take into account the duration tP of the data packets of the flow.

Figure 4:
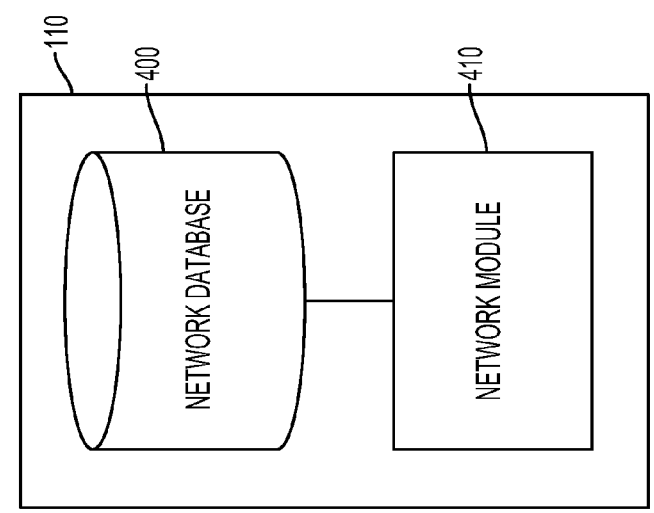
FIG. 4 is a high-level schematic diagram of an example of a network controller of the network communication system of FIG. 1, in accordance with an embodiment.

FIG. 4 illustrates a high-level schematic diagram of an example of a network controller 110. As shown, the network controller 110 includes a network database 400. The network database is populated with data relating to the topology and operating characteristics of the network communication system, and more particularly, of the packet-switched network 140. For instance, the network database 400 can include records identifying each of the data sources 120, each of the nodes 150, 160, and 170, and each of the data destinations 130, each of the links interconnecting the nodes, each of the possible source routes among the packet-switched network 140, and each of the transmission delays associated with the possible source routes. Moreover, the network controller 110 is configured to determine when the source route of a flow of data packets is to be rerouted in the packet-switched network 140, for example depending on administrative and/or operational reasons. In an embodiment, the rerouting is initiated by the network controller 110 by transmitting a command to reroute to the first node 150. In other embodiments, the rerouting is initiated by a device coupled to the packet-switched network by transmitting a network command indicative of the command to reroute to the first node 150. In other words, the network command (e.g., the command to reroute) which is to be received by the first node 150 is not limited to being originally transmitted by the network controller 110, and can be transmitted by a third-party device, e.g., any node coupled to the network 140, for instance.

At least some of the data stored in network database 400 may be accessed prior to the network controller 110 transmitting a network command. The network database 400 may be updated when the topology and operating characteristics of network 140 change, e.g., as new nodes or links are added or upgraded, or as nodes or links fail or are removed. Updates regarding changing network conditions may be received from the nodes, or from dedicated monitors (not shown) connected to network 140. In an embodiment, the network database 400 may be updated in real-time or near real-time.

Still referring to FIG. 4, the network controller 110 includes a network module 410 operatively connected to the network database 400. The network module 410 generates the source route for the flow and transmits the source route, along with the transmission delay associated therewith to the first node 150 for that flow, either directly or indirectly via the network 140.

Figure 5:
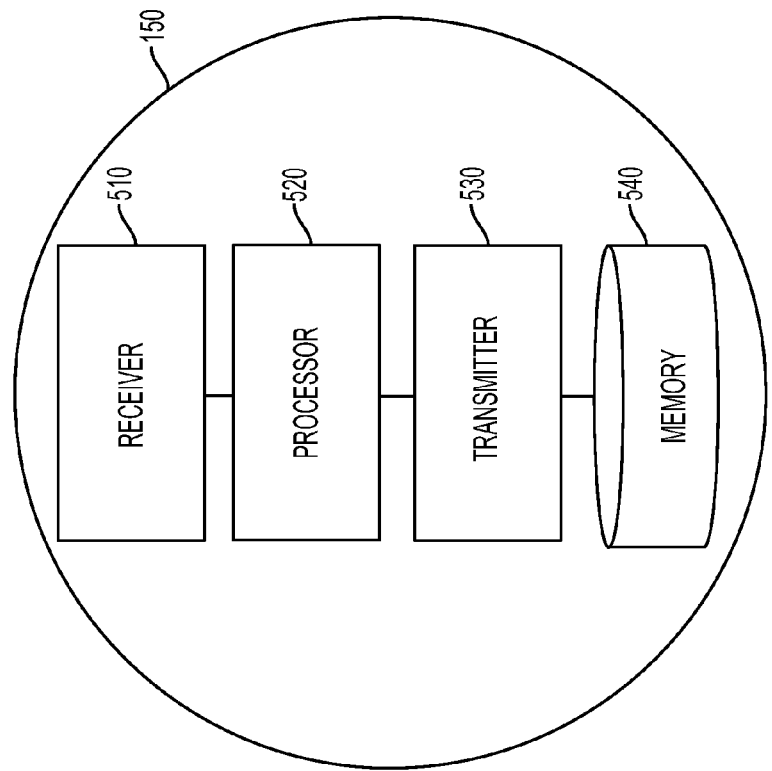
FIG. 5 is a high-level schematic diagram of an example of an ingress node of the network communication system of FIG. 1, in accordance with an embodiment.

FIG. 5 illustrates a high-level schematic diagram of an example of a first node 150. As depicted, the first node 150 includes a receiver 510 which is configured to receive from the network controller 110 a command to reroute a flow to the second source route R2.

In this embodiment, the receiver 510 of the first node 150 is operatively connected to a processor 520 and to a transmitter 530 which is configured to route the flow along a first source route specified by the network controller 110. In the methods and systems described herein, the processor 520 is configured to, after reception of the command to reroute to the second source route, route the flow to the second source route when the period of time having the given threshold time value is detected.

In an embodiment, the first node 150 includes a memory 540 connected thereto for storing the tolerance time value to which the first and the second transmission delays dt1 and dt2 are to be compared. In an embodiment, the tolerance time value is permanently stored on the memory 540. In another embodiment, the tolerance time value is specified by the network controller 110 when commanding to reroute a flow, along with the second source route and the second transmission delay. Moreover, the tolerance time value can be constant, or variable depending on the flow of data packets and on time lengths of the data packets, or other network parameters.

The command to reroute may be sent to the ingress node or to any one of the intermediate nodes 160 that is common to the first and second source routes.

In the depicted embodiment, the nodes 150, 160, and 170 are active electronic devices which are configured to transmit, receive and/or forward information over the packet-switched network 140. For instance, the nodes 150, 160, and 170 can be data communication equipment (DCE) such as switches, modems, hubs or bridges, data terminal equipment (DTE) such as routers, workstations, or servers, and/or a combination thereof.

Figure 6:
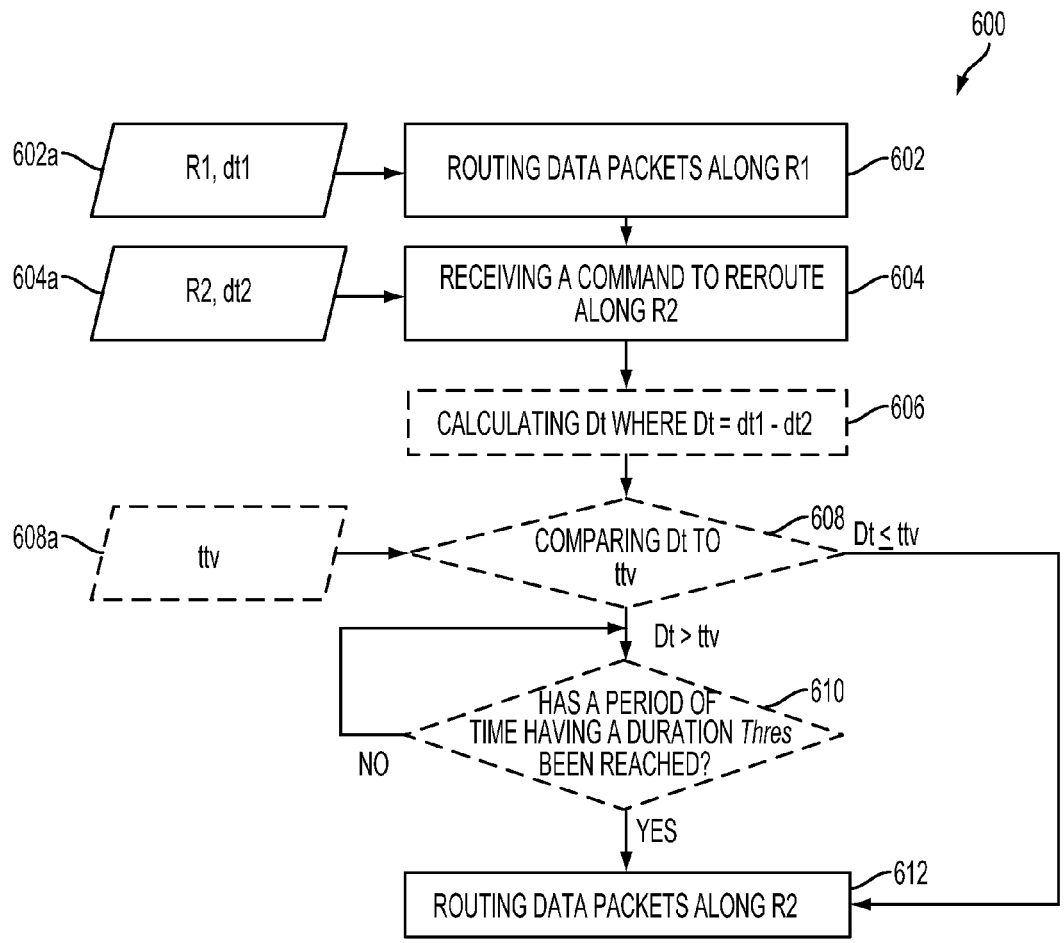
FIG. 6 is a flowchart of a first example of a method for rerouting data packets in a network, in accordance with an embodiment.

FIG. 6 is a flowchart of a first example of a method 600 for rerouting data packets in a flow through the network 140 made of a plurality of nodes 150, 160, and 170 operatively coupled to one another. This method begins at 602 by routing, with the first node 150, data packets in the flow along a first source route R1. Data relative to the first source route, for example, the sequence of nodes and/or links to be followed by the data packets along the first source route R1 and/or to the first transmission delay dt1, can be sent from the network controller 110 to the first node 150 at 602a. At some point during routing the data packets along R1 (602), the first node 150 receives at 604, from the network controller 110, a command to reroute the flow of the data packets from the first source route R1 to a second source route R2. Data relative to the second source route R2, such as the sequence of nodes and/or links to be followed by the data packets along the second source route R2 and the second transmission delay dt2 are determined at 604a. At 606, a transmission delay difference Dt can be calculated by the network controller 110 or by the first node 150, for instance. At 608, the previously calculated Dt is optionally compared to a tolerance time value accessible at step 608a. When it is determined that the transmission delay difference is smaller than the tolerance time value, the command to route the flow along the second source route R2 can be executed at 612 by routing the next data packet in the flow along the second source route R2. When it is determined that the transmission delay difference is greater than the tolerance time value, at 610, the node 150 measures the time elapsed between consecutive packets of the flow, and routes the next data packet in the flow along the second source route R2 only upon detecting an elapsed time greater than the threshold time value. Step 606 is optional, as the tolerance time value could be compared directly to the first transmission delay dt1 and to the second transmission delay dt2 in some circumstances. As identified by the dashed boxes 606, 608 and 608a, some operations may not be performed directly by the first node 150. For instance, the step of comparing at 608 may be performed by the network controller 110 and communicated to the first node 150 in an embodiment.

Figure 7:
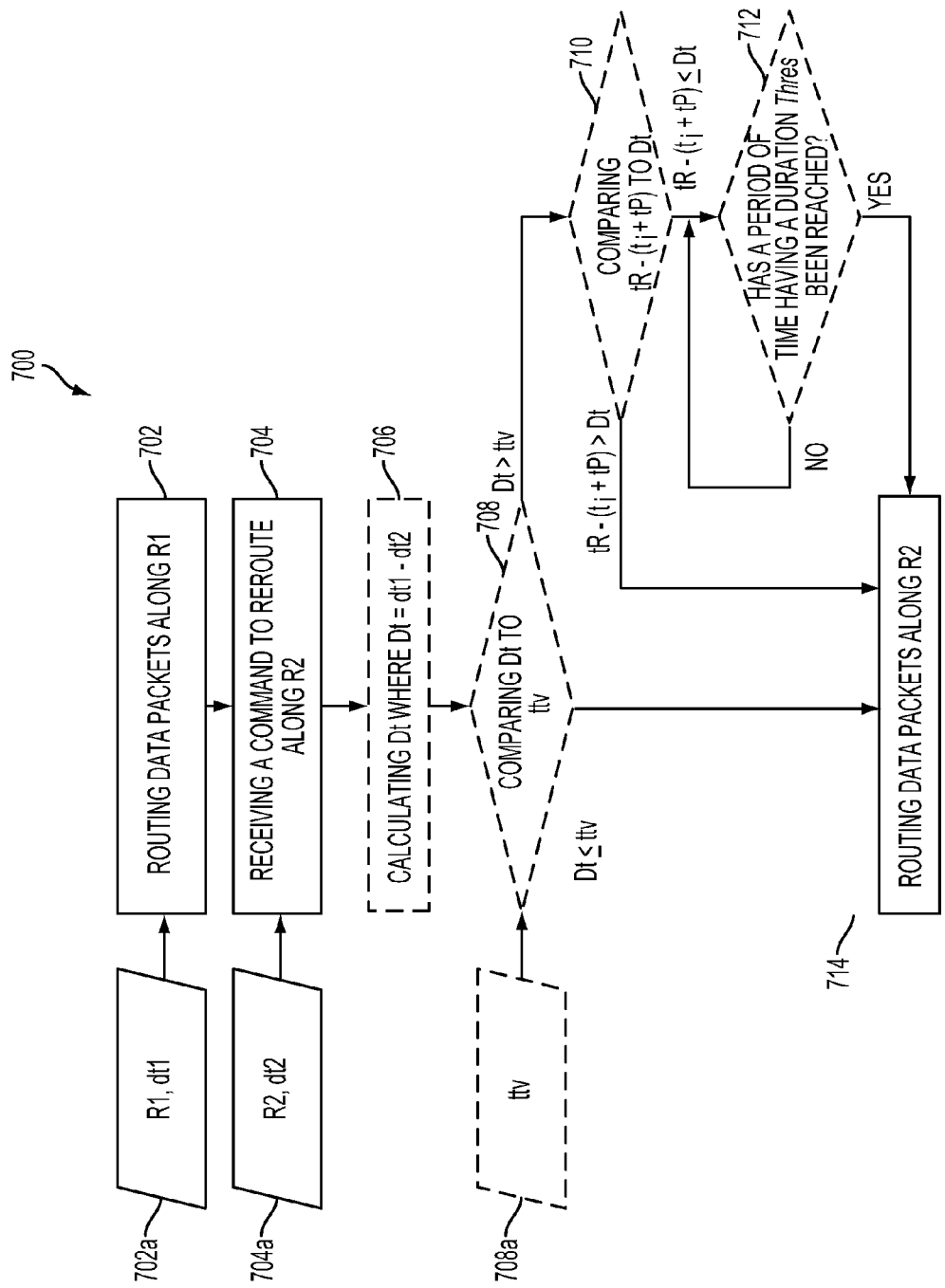
FIG. 7 is a flowchart of a second example of a method for rerouting data packets in a network, in accordance with an embodiment.

FIG. 7 is a flowchart of a second example of a method 700 for rerouting data packets of a flow in the network 140 made of a plurality of nodes 150, 160 and 170 operatively coupled to one another. This method 700 comprises steps 702, 702a, 704, 704a, 706, 708 and 708a which correspond to the steps 602, 602a, 604, 604a, 606, 608 and 608a of the method 600. In this example, tR is a time corresponding to the reception of the command to reroute, $t_i$ is a time corresponding to the beginning of transmission of data packet $P_i$ where the data packet $P_i$ is the last data packet in the flow sent prior to receiving the command to reroute, and $t_{i+1}$ is a time corresponding to the beginning of transmission of data packet where the data packet $P_{i+1}$ is the first data packet in the flow to be sent by the first node 150 after receiving the command to reroute, so that $P_{i+1}$, $t_i$<tR<$t_{i+1}$. When it is determined at 708 that the transmission delay difference Dt is greater than the tolerance time value, the transmission delay difference Dt is compared at 710 to times $t_i$, tR, $t_{i+1}$ and tP. At 710, the first node 150 monitors an elapsed time corresponding to the time passed since the end of the last data packet Pi in the flow was sent and determines if this elapsed time is greater than Dt. If so, the data packets are routed to the second source route R2, if not the first node 150 routes the data packets of the flow to the first source route R1 until a period of time having a duration Thres is detected. More specifically, when a time elapsed from a time $t_i$+tP associated with the end of transmission of data packet Pi to the time tR associated with the reception of the command to reroute is greater than the transmission delay difference Dt, that is tR−($t_i$+tP)>Dt, the first node 150 routes the next data packet in the flow to the second source route R2. On the other hand, when this time elapsed is smaller than the transmission delay difference Dt, tR−(ti+tP)≤Dt, the first node 150 routes the data packets in the flow to the second source route R2 when a time between consecutive packets in the flow corresponding to the threshold time value Thres is detected at 712. The time may be detected between a data packet $P_i$ sent prior to reception of the command to reroute and a data packet $P_{i+1}$ to be sent after the reception. In another embodiment, the time may be detected between two subsequent and successive data packets of the flow $P_{i+k+1}$ and $P_{i+k+2}$, where i and k are positive integers. As identified by the dashed boxes 706, 708, 708a and 710, some operations may not be performed directly by the first node 150. For instance, the steps of comparing at 708 and 710 may be performed by the network controller 110 and communicated to the first node 150 in an embodiment.

In an alternative embodiment, the network controller 110 may have information regarding the expected arrival times of the packets in a flow, at an ingress node 150 of the network and/or at other nodes 160, 170 along their path. In this embodiment, when the network controller 110 decides to reroute the flow from a first source route R1 to a second source route R2, the network controller 110 may have sufficient information to identify the next instance of a period of time between consecutive packets $P_{i+k+1}$ and $P_{i+k+2}$ that is greater than Dt, following the decision to reroute the flow. In this embodiment, the network controller 110 may send an instruction to an appropriate node 160 in the network to reroute the flow from a first source route R1 to a second source route R2, the instruction identifying the packet $P_{i+k+1}$ after which the rerouting is to take place. The node 160, upon receiving the instruction from the network controller 110, will route packets $P_{i+1}$ through $P_{i+k+1}$ along the first source route R1, and will route packet $P_{i+k+2}$ along the second source route R2. In sending the instruction to the node receiving the instruction, the network controller can communicate directly with the receiving node, or can communicate with the receiving node via one or more intermediate node(s), such as by including instructions that will be repeated by the intermediate nodes until reaching the receiving node for instance. The network controller 110 may alternatively wait to instruct the node 160 to reroute the flow, and send the instruction only at a time between the arrival of packets $P_{i+k+1}$ and $P_{i+k+2}$ at the node 160.

Figure 8:
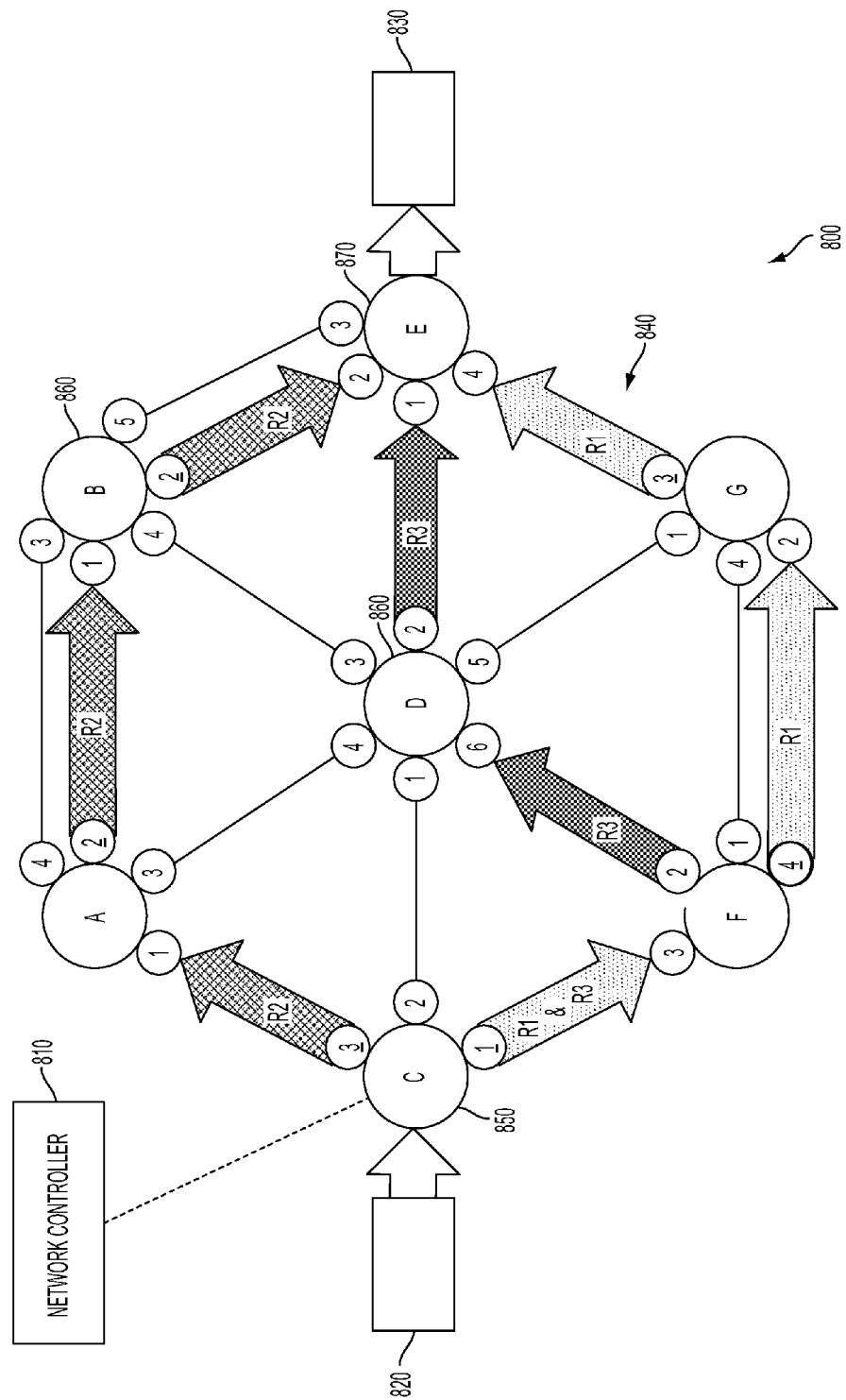
FIG. 8 is a network diagram of a second example of a network communication system, in accordance with an embodiment.

FIG. 8 is a network diagram of an example network communication system 800. In this example, nodes A, B, C, D, E, F, G form a packet-switched network 840. The node C is an ingress node 850 and the node E is an egress node 870 associated with a given flow. Data is to be transmitted from a data source 820 to a data destination 830 via at least the ingress node C and the egress node E. The communication protocols involved herein in system 800 may be loose link source routing, strict link source routing and/or multiprotocol label switching (MPLS) segment routing. The network communication system 800 includes, for instance, bidirectional links and double links interconnecting some of the nodes A, B, C, D, E, F and G. The arrows identified with R1 show a first source route R1. The data relative to the first source route may be a sequence of nodes to follow, such as nodes C, F, G and E in an example, or a sequence of links to follow, such as links 1, 4 and 3 between respective nodes along the path. When the ingress node 850 receives, from a network controller 810, a command to reroute a flow of data packets from the first source route R1 to the second source route R2 along with data relative to R2, the ingress node 850 performs the methods disclosed herein prior to rerouting the data packets of the flow along the second source route R2. The data relative to the second source route may be a sequence of nodes to follow, that is nodes C, A, B and E, or a sequence of links to follow, that is links 3, 2 and 2, for instance. Once the command to reroute is received, the ingress node 850 verifies that packets sent along R2 would cause no re-ordering of the data packets prior to actually rerouting the data packets by performed methods as disclosed herein. In another embodiment, the flow is rerouted from the first source route R1 to a third source route R3, which follows nodes C, F, D and E. In this specific embodiment, the command to reroute can be sent, directly or indirectly, to either node C or F, depending on the circumstances. More broadly stated, the second source route can include none, one, or more than one of the nodes of the first source route depending on the embodiment.

Referring back to FIG. 1, the network 140 is an Ethernet network including a plurality of wired links. However, in another embodiment, network 140 can be another type of the packet-switched network 140 such as a frame relay network, an Asynchronous Transfer Mode (ATM) network, a general packet radio service (GPRS) network, or the like, and may include a plurality of wired links, wireless links, or a combination thereof.

In another embodiment, the network 140 is a MPLS network where the first node 150 is a MPLS switch which is configured to process the data packets according to the methods presented herein. In this embodiment, the MPLS switch can be hardcoded using electronic circuits and/or a microcontroller, for instance.

In another embodiment, network controller 110 is a software-defined network (SDN) controller and performs control plane functions for packet-switched network 140. The network controller 110 may, e.g., be an OpenDaylight SDN controller, an Open Network Operating System (ONOS) SDN controller, or the like. In another embodiment, the network controller 810 may be a non-SDN network controller.

The network controller 110 may also perform traffic engineering functions for the network 140. For example, the network controller 110 may determine optimal paths for packets transmitted in the network 140, and may schedule departure times of packets at nodes of system 110, e.g., at nodes 150, 160, and 170 such that delay and jitter for transmission of such packets over network 140 is minimized. Network controller 110 may communicate with nodes of system 100, e.g., data sources 120 and nodes 150, 160 and 170 according to the OpenFlow™ protocol and/or the Protocol-Oblivious Forwarding (POF) protocol. The network controller 110 can also perform various other control plane functions, including network configuration, network monitoring, etc., for network 140.

In the illustrated embodiment, the first node 150 is a SDN switch which is programmable to perform the methods described herein. In another embodiment, the first node 150 is a MPLS switch which is programmable to perform the methods described herein. Indeed, in an embodiment where the first node 150 is programmable, the memory 540 can have stored thereon a program which processes the data packets according to the methods presented herein. In an embodiment, the program is permanently or temporarily installed in the form of routing instructions on the memory 540 by the network controller 110. In another embodiment, the network database 400 of the network controller 110 has stored thereon the routing instructions in order to install these instructions on the memory 540 of the node 150. for instance.

Embodiments disclosed herein may be implemented by using hardware, software or a combination thereof. Based on such understandings, the technical solution may be embodied in the form of a software product. The software product may be stored in a non-volatile or non-transitory storage medium, which can be a compact disk read-only memory (CD-ROM), USB flash disk, a solid-state drive or a removable hard disk. The software product includes a number of instructions that enable a computer device (personal computer, server, or network device) to execute the methods provided in the embodiments.

Program code is applied to input data to perform the functions described herein and to generate output information. The output information is applied and/or transmitted to one or more output devices, such as the second node 170, for instance. In accordance with an embodiment, the input data of the program code can correspond to the flow of data packets received by the first node 150 while the output information can correspond to the flow of data packets having some or no delayed data packets therein, in accordance with an embodiment of the methods described herein. In accordance with another embodiment, the program code can provide the tolerance time value for the step of comparing the first and second transmission delays prior to rerouting the data packets. Also, the program code can be provided in the form of a computer software product to installed on the first node 150, for instance. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, or a combination thereof.

Each computer program may be stored on a storage medium or a device (e.g., ROM, magnetic disk, optical disc, solid-state drive), readable by a general or special purpose programmable computer, for configuring and operating the computer when the storage medium or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, volatile memory, non-volatile memory and the like, in magnetic or electronic form, etc. The term non-transitory is not intended to exclude computer readable media such as primary memory, volatile memory, RAM and so on, where the data stored thereon may only be temporarily stored. The computer useable instructions may also be in various forms, including compiled and non-compiled code.

The systems and methods of the described embodiments can include servers, services, interfaces, portals, platforms, or other systems formed from hardware devices can be used. The use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work.

Such hardware limitations are clearly essential elements of the embodiments described herein, and they cannot be omitted or substituted for mental means without having a material effect on the operation and structure of the embodiments described herein. The hardware is essential to the embodiments described herein and is not merely used to perform steps expeditiously and in an efficient manner.

Although the present invention and its advantages have been described in detail, various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

As can be understood, the examples described above and illustrated are intended to be by way of example only. For instance, the methods and systems disclosed herein may be used to address issues associated with re-ordering of data packets belonging to two successive flows. Moreover, it is found that although the methods disclosed herein may be performed by an ingress node, they can also be performed by any other node of the packet-switched network. Indeed, the term ingress node should not be construed as to exclude other types of nodes of the packet-switched network such as intermediate nodes and egress nodes. Although this disclosure presents examples where the given threshold value is associated to the first and second transmission delays $dt1$ and $dt2$, in alternate embodiments, the sufficient threshold value can be determined on a basis other than the first and second transmission delays $dt1$ and $dt2$. The scope is indicated by the appended claims.

What is claimed is:

1. A node for routing data packets in a flow, the node comprising:
   a receiver configured to receive a command to reroute the flow from a first source route to a second source route;
   a processor for determining, in response to the command to reroute the flow, that a period of time between first and second consecutive data packets of the flow at the node exceeds a threshold value; and
   a transmitter configured to transmit the second data packet on the second source route in response to the determination.

2. The node of claim 1, wherein the first source route has a first transmission delay, the second source route has a second transmission delay, and the threshold time value is based on a difference between the first transmission delay and the second transmission delay.

3. The node of claim 2, wherein the receiver is configured to receive information regarding the duration of at least one of the first transmission delay and the second transmission delay from an external source.

4. The node of claim 1 wherein the transmitter is configured to transmit the first data packet on the first source route prior to transmitting the second data packet.

5. The node of claim 1, wherein the transmitter is configured to route the second data packet on the first source route if the period of time does not exceed the threshold value.

6. The node of claim 1, wherein said period of time is measured from the completion of the routing of the first data packet to the beginning of the routing of the second data packet.

7. The node of claim 1, wherein the node is at least one of a router and a switch.

8. The node of claim 1, wherein routing of the data packets involves multiprotocol label switching (MPLS).

9. A method for routing data packets in a flow at a node, the method comprising the steps of:
   receiving a command to reroute the flow from a first source route to a second source route, the first and the second source routes being different;
   determining, in response to the command to reroute the flow, that a period of time between first and second consecutive data packets of the flow at the node exceeds a threshold value; and
   transmitting the second data packet on the second source route in response to the determination.

10. The method of claim 9, wherein the threshold time value is based on a comparison between a first transmission delay associated with the first source route and a second transmission delay associated with the second source route.

11. The method of claim 9, wherein said transmitting includes transmitting the second data packet on the first source route if the period of time does not exceed the threshold value.

12. The method of claim 9, wherein routing of the data packets involves multiprotocol label switching (MPLS).

13. A network controller for controlling a flow of data packets through a network, the network controller configured to:
   determine expected arrival time information for two or more consecutive data packets in the flow;
   determine that a period of time between first and second consecutive data packets of the flow exceeds a threshold value based on the expected arrival time information; and
   transmit, to a node in the network, an instruction to reroute the flow from a first source route to a second source route in response to the determination, such that the node transmits the first data packet along the first source route and transmits the second data packet along the second source route.

14. The network controller of claim 13, wherein the first source route has a first transmission delay, the second source route has a second transmission delay, and wherein the network controller is further configured to determine the threshold time value based on a difference between the first transmission delay and the second transmission delay.

15. The network controller of claim 13 wherein the instructions to reroute include data packet information allowing the node to determine the correct moment to perform the rerouting of the flow.

16. The network controller of claim 15 wherein the data packet information includes an identity of the first and second consecutive data packets allowing the first and second consecutive data packets to be recognized by the node.

17. The network controller of claim 13 wherein the processor is further configured to determine a correct moment to perform the rerouting of the flow at the node based on said estimated arrival times and wherein the transmitter transmits the instructions to reroute to the node based on said determination of the correct moment.

18. The network controller of claim 13 further comprising a network database having stored thereon a computer software product executable by the network module, the computer software product having computer code to install routing instructions on the node of the network, the routing instructions being executable by a processor of the node and instructing the node to perform the following steps:
   after receiving of the command to reroute the flow, determining that a period of time between first and second consecutive data packets of the flow exceeds a threshold value; and
   transmitting the second data packet on the second source route in response to the determination.

19. A method of routing a flow of data packets through a network, the method comprising:
   determining expected arrival time information for two or more consecutive data packets in the flow;
   determining that a period of time between first and second consecutive data packets of the flow exceeds a threshold value based on the expected arrival time information; and
   transmitting, to a node in the network, an instruction to reroute the flow from a first source route to a second source route in response to the determination, such that the node transmits the first data packet along the first source route and transmits the second data packet along the second source route.

20. The network controller of claim 19, wherein the first source route has a first transmission delay, the second source route has a second transmission delay, further comprising determining the threshold time value based on a difference between the first transmission delay and the second transmission delay.

21. The method of claim 19 wherein the instructions to reroute include data packet information allowing the node to determine the correct moment to perform the rerouting of the flow.

22. The method of claim 21 wherein the data packet information includes an identity of the first and second consecutive data packets allowing the first and second consecutive data packets to be recognized by the node.

23. The method of claim 21 wherein the transmitting of the instructions to reroute to the node is done indirectly, via an intermediate one of the nodes.

24. The method of claim 20 further comprising determining a correct moment to perform the rerouting of the flow at the node based on said estimated arrival times and wherein said transmitting of the instructions to reroute to the node is done based on said determination of the correct moment.

25. The method of claim 19 further comprising installing routing instructions on the node, the routing instructions being executable by a processor of the node and instructing the node to perform the following steps:
- after receiving of the command to reroute the flow, determining that a period of time between first and second consecutive data packets of the flow exceeds a threshold value; and
- transmitting the second data packet on the second source route in response to the determination.

* * * * *

UNITED STATES PATENT AND TRADEMARK OFFICE
CERTIFICATE OF CORRECTION

PATENT NO. : 9,838,311 B2
APPLICATION NO. : 14/610608
DATED : December 5, 2017
INVENTOR(S) : Peter Ashwood-Smith Page 1 of 1

It is certified that error appears in the above-identified patent and that said Letters Patent is hereby corrected as shown below:

On the Title Page

(73) Assignee: replace "Shenzen" with -- Shenzhen --.

Signed and Sealed this
First Day of May, 2018

Andrei Iancu
*Director of the United States Patent and Trademark Office*